United States Patent [19]

Bommarito

[11] Patent Number: 4,795,653

[45] Date of Patent: Jan. 3, 1989

[54] DIETARY FIBER AND METHOD OF MAKING

[76] Inventor: Alexander A. Bommarito, 12555 W. Freeland Rd., Freeland, Mich. 48623

[21] Appl. No.: 90,919

[22] Filed: Aug. 31, 1987

Related U.S. Application Data

[63] Continuation-in-part of Ser. No. 875,054, Jun. 16, 1986, abandoned.

[51] Int. Cl.$^4$ .................... A23L 1/214; A23L 1/2165; A23L 1/29
[52] U.S. Cl. ................................. 426/615; 426/637; 426/640; 426/648
[58] Field of Search .............. 426/615, 637, 640, 648, 426/335, 544, 804, 810; 514/867, 882

[56] References Cited

U.S. PATENT DOCUMENTS 1,448,512  3/1923  Benjamin ............................ 426/615
4,451,489  5/1984  Beale et al. ......................... 426/640

FOREIGN PATENT DOCUMENTS 2238016  8/1972  Fed. Rep. of Germany ...... 426/640
0009665  1/1983  Japan ................................... 426/615
0121355  12/1918  United Kingdom ............... 426/640

OTHER PUBLICATIONS

Barrows et al., Effect of a High Protein, Very Low Calorie Diet on Resting Metabolism, Thyroid Hormones, and Energy Expenditure of Obese Middle-Aged Woman, Am J. Clin. Nutr., 1987, 45:391-398.
Tredger et al., "Blood Glucose & Insulin Levels in Normal Subjects Following a Meal With and Without Added Sugar Beet Pulp"; Diabete & Metabolisme (Paris) 1981, 7, 169-172.

Primary Examiner—Marianne Cintins
Attorney, Agent, or Firm—Merlin B. Davey

[57] ABSTRACT

Natural dietary fibers having excellent palatability and utility as a dietary supplement are readily prepared by peeling, shredding, extracting, pressing and drying the below-ground portion of members of the chenopodiaceae family at a fiber temperature below 300° F. and treating with a bactericide and antioxidant.

6 Claims, No Drawings

DIETARY FIBER AND METHOD OF MAKING

CROSS REFERENCE TO RELATED APPLICATIONS

This application is a continuation-in-part of application Ser. No. 875,054 filed June 16, 1986.

BACKGROUND OF THE INVENTION

Dietary fiber consists of the non-digestible polysaccharide fractions of plant fiber and is classified as water soluble (pectin or guar), and water insoluble products such as wheat bran. These fibers all have different characteristics and subsequently different metabolic and physiologic effects. The generalized metabolic effects of fiber have been demonstrated in several studies. These include change in the fermentation products and effect on short chain fatty acids in the colon, which effects hepatic glucose and lipid metabolism. Additionally, fiber has been shown to affect gastric emptying and serum insulin responses by a variety of mechanisms resulting in enhanced peripheral receptor site sensitivity to insulin. Because of the changes noted in carbohydrate absorption and metabolism, fiber has been studied as a supplemental treatment of diabetes mellitis.

The roles of dietary fiber as an alexeteric for protecting the gastrointestinal tract from diseases have also been documented. These include reduction in gastrointestinal cancer incidence, constipation, hiatal hernia, appendicitis, diverticular disease, and hemorrhoids. There are also implications of its use in the treatment or prevention of "irritable bowel syndrome".

It is known that the loss of branched-chain amino acids in caloric restricted diets is a loss in lean body mass from atrophy of the columnar cells of the gastrointestinal tract, and will lower resting energy expenditure.

Currently, fiber has been implicated in weight reduction diets and is thought to work by various mechanisms. One mechanism proposed is the delay in gastric emptying and faster transit time in the small bowel association with high fiber diets. The adsorption properties of fiber in the gastrointestinal tract have resulted in the lowering of glucose absorption, resulting in lower: serum glucose, insulin levels and gastric inhibitory peptide. The physiologic responses implicate some forms of fiber as an active pharmacologic agent in appetite suppression and hyperglycemia. The physical bulk effect of the agent, increasing gastric distention, may also explain earlier satiety.

The effect of fiber on fat absorption has led to several studies indicating the advantages of high fiber diets in reduction of serum cholesterol levels and weight loss in the treatment of hypertension.

Sugar beet pulp, as presently obtained, is a product of the sugar beet refining process and contains 48% pectin by weight under current methods of extraction and has a coefficient of expansion of about 2 in aqueous solutions.

A study by Tredger, Sheard and Marks, "Blood Glucose and Insulin Levels in Normal Subjects Following a Meal With and Without Added Sugar Beet Pulp" in *Diabete & Metabolisme* (Paris), 1981, 7, 169–172, concluded that:

"—both on the grounds of efficacy and acceptability our studies suggest it is unlikely that sugar beet pulp has any part to play in the dietary management of diabetic patients".

SUMMARY OF THE INVENTION

I have now found that natural dietary fibers having excellent palatability and utility as a dietary supplement are readily prepared by a process comprising peeling, shredding, extracting with essentially alcohol-free water, pressing and drying the belowground portion, i.e. the bulbs, roots or tubers, of members of the chenopodiaceae family at a fiber temperature below 300° F., preferably below 220° F.

Advantageously the fibers are treated with a bactericide and an antioxidant during processing.

DETAILED DESCRIPTION OF THE INVENTION

The following description is, for ease of understanding, directed to the preparation of dietary fiber having natural caloric values from sugar beets, but it is understood that the process is not so limited and that this process is inclusive of the preparation of natural dietary fibers having natural caloric values from the belowground portions, e.g., bulbs, roots and tubers of the chenopodiaceae (goosefoot) family, beta vulgaris species, such as red beets, sugar beets, table beets and mangel-wurzels.

In a specific example of the process of this invention, a tuber, such as a sugar beet tuber, is washed with alcohol-free water and the peel or outer skin is removed. The skinned tuber is then placed in a bactericidal solution, such as, for example, a dilute acetic acid solution (0.5 to 60.0% acetic acid, preferably about 5% acetic acid), after which the tuber is shredded to produce a cossette, the length not being critical, advantageously having a thickness of no more than about ¼ inch and preferably having a thickness of from about 1/64 to ⅛ inch and most preferably having a thickness of from about 1/32 to about 1/16 inch. The cossette is again washed with a bactericidal solution, advantageously dilute acetic acid (0.6 to 5%) and then placed in non-alcoholic water at a temperature above about 35° F. (preferably 100°–140° F.) and an antioxidant, preferably ascorbic acid at a ratio of about 2.5 grams of ascorbic acid per pound of cossettes. Temperatures up to 200° F. may be employed if desired. However at such temperatures carbohydrate losses are excessive. After treatment with the antioxidant in warm water, the cossettes are pressed dry and thereafter dehydrated and heat sterilized, for example, by sun-drying, forced-air dehydration, tunnel drying, cabinet drying, pneumatic drying or freeze drying, it being essential that the drying method maintain the temperature of the fibers below about 300° F. After drying, the fiber, having a coefficient of expansion of about 6 when dried to a moisture content of 7 to 10 percent, is ready for milling and packing for use as desired.

Other bactericides such as, for example, H$_2$O$_2$ benzoic acid, mandelic acid, salicylic acid and methyl or propyl p-hydroxy benzoate may be employed, as desired. Non-chemical bactericidal treatments may also be employed. Other antioxidants such as, for example, benzoic acid, butylated hydroxytoluene (BHT), butylated hydroxyanisole (BHA), ethylenediamine, sodium bisulfite, sulfur dioxide, maleic acid, propyl gallate and sodium metabisulphite may be employed, if desired.

The so-prepared fibers may be used as a food product, an adsorbent and protective natural fiber "alexeteric", an anorexic dietary supplement, a bulk laxative, an antispasmodic in the treatment of irritable bowel syndrome, an antihyperlipidemic, use in non-insulin dependent diabetes and in the correction of gastric inhibitory peptide levels in obese people.

The process of this invention has been found to remove substantially all of the naturally occurring toxicants, i.e. nitrates, oxalates and saponins as well as the silica occurring in sugar beets and other natural fibrous vegetables while retaining the pectic substances, cellulose, hemicellulose, lignin, carbohydrates, nitrogenous compounds such as proteins, and mineral matter.

The fibers prepared by the process of this invention generally have a coefficient of expansion in aqueous solution of at least 4 and typically have a coefficient of expansion of about 6 to about 12 at ambient conditions when dried to a moisture content of 7 to 10 percent by weight.

In a test with 39 subjects, beta vulgaris (sugar beet) fibers prepared in accordance with the process of this invention and having a coefficient of expansion of about 6, there were no reported adverse reactions or effects. Metabolic measurements indicated no alteration in resting energy expenditure (REE), although REE would be expected to decrease with decreased caloric intake as described in *Am. J. Clin. Nutr.* (1987) 45:391-8 "Effect of a High Protein, Very Low Calorie Diet on Resting Metabolism, Thyroid Hormones and Energy Expenditure of Obese Middle-Aged Women" by K. Barrows et al.

The above test with 39 subjects indicates the potential usefulness of the fibers prepared by the process of this invention in weight loss programs, treatment of irritable bowel syndrome, as a bulk laxative and as an alexeteric. The ability of the product of this invention to inhibit metabolic adaptation to caloric restriction is novel and unexpected and is unique in pharmacology. This result is believed to be because the product this invention produces works on the gastrointestinal tract and inhibits the atrophy of the cells of the gastrointestinal tract. The fiber of this invention thus affects digestion, absorption and intestinal hormone production and has a systemic effect on homeostasis.

The caloric complex of this invention contains mono-, di-, and trisaccharides mixed in the natural cementing agents of the sugar beet, i.e. pectic materials having a molecular weight of about 70,000 and being high in acetyl groups and low in methylated carboxyl groups and with carbohydrates of molecular weights up to 10,000 or more and including hemicellulose, cellulose and lignin. This complex can fix, e.g. alcohols, making them very difficult to remove from dried material. In the complex of this invention the carbohydrates are fixed and produce beneficial physiological and pharmacological effects.

Various modifications may be made in the present invention without departing from the spirit or scope thereof and it is understood that I limit myself only as defined in the appended claims.

I claim:

1. A process for the production of natural caloric dietary fiber having the effect of at least maintaining resting energy expenditure upon decreased caloric intake, said fiber containing pectic substances, cellulose, hemicellulose, lignin, carbohydrates, nitrogenous compounds, and mineral matter and having a coefficient of expansion of at least about 4 when dried to a water content of 7 to 10% by weight from the bulbs, roots or tubers of members of the chenopodiaceae family said process consisting essentially of washing said bulds, roots or tubers with alcohol-free water, removing the outer skin, shredding said bulbs, roots or tubers to a thickness of less than about ¼ inch, washing in non-alcoholic water at a temperature above about 35° F. and below about 140° F. and drying at a fiber temperature below 300° F.

2. Process of claim 1 wherein the member of the chenopodiaceae family is a sugar beet.

3. Process of claim 2 wherein the fibers are shredded to produce cossettes having a thickness of from about 1/64 about ⅛ inch.

4. Natural caloric dietary fiber from the bulbs, roots or tubers of a member of the chenopodiaceae family containing pectic substances, cellulose, hemicellulose, lignin, carbohydrates, nitrogenous compounds and mineral matter and being substantially free of nitrates, oxalates and saponins and having a coefficient of expansion of at least about 4 when dried to a water content of 7 to 10 percent by weight, said fiber having the effect of at least maintaining resting energy expenditure upon decreased caloric intake.

5. Dietary fiber of claim 4 having a coefficient of expansion of at least 6.

6. A food product or dietary supplement consisting essentially of the fiber of claim 4.

* * * * *